Sept. 13, 1949. T. J. LEHANE 2,481,849
THERMOSTATICALLY CONTROLLED SPACE HEATER
Filed Sept. 3, 1943 2 Sheets-Sheet 2

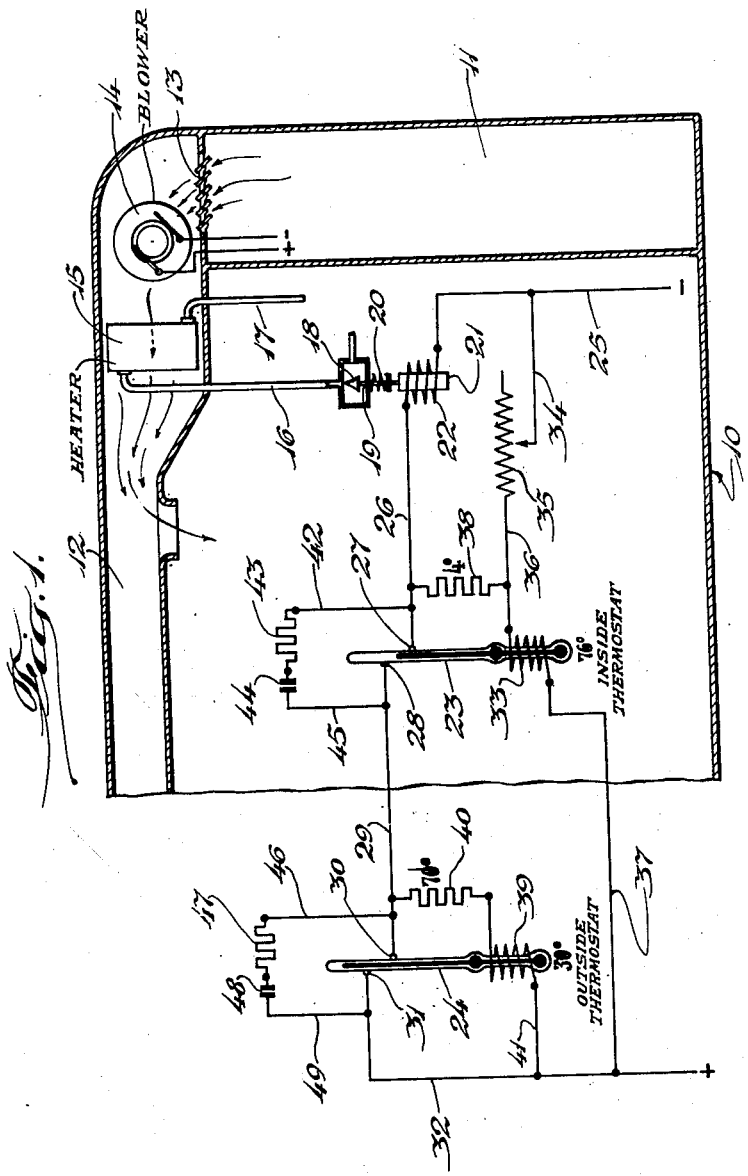

Inventor:
Timothy J. Lehane
By Barnett & Truman
Attorneys.

Patented Sept. 13, 1949

2,481,849

UNITED STATES PATENT OFFICE 2,481,849

THERMOSTATICALLY CONTROLLED SPACE HEATER

Timothy J. Lehane, Chicago, Ill., assignor, by mesne assignments, to Vapor Heating Corporation, a corporation of Delaware Application September 3, 1943, Serial No. 501,081

5 Claims. (Cl. 236—91)

This invention relates to improvements in thermostatically controlled electric circuits and particularly to a circuit of this general character for controlling the delivery of heat to an enclosed space.

The invention may be described briefly as including a means for supplying heat to an enclosed space, which means includes an electrically energized device and a plurality of circuit changing devices, for example, thermostats of the mercury column type, arranged in series in the electric circuit for energizing said device and responsive to predetermined temperatures at different locations whereby any one of the said thermostats may function under certain conditions, to make or break the circuit through said electrically energized device.

A principal object of this invention is to provide an improved thermostatically controlled electric circuit in which a plurality of thermostats are employed to control the energization of a working resistance in said circuit. The said resistance may be in the form of a solenoid for actuating an inlet valve to a radiator, or it may be any other form of working resistance for directly or indirectly controlling the supply of heat delivered to the enclosed space whose temperature is being controlled.

It is a further object of the present invention to provide an improved thermostatically controlled electric circuit of the above character which is particularly suitable for use in connection with a heating system wherein the thermostat for controlling the supply of heating medium is automatically selected by the fall of the outside temperature below a predetermined minimum or by the fall of the temperature below a predetermined minimum at one or more locations within the heated enclosure.

A further and more specific object of the invention is to provide a thermostatically controlled circuit of the above character in which the supply of heating medium to the radiators of a heating system may be varied in direct relation to the rise and fall of the temperature to which the controlling thermostat responds, that is to say, the heating medium will be intermittently supplied to the radiator for progressively longer periods as the temperature continues to decline below the predetermined minimum and will progressively shorten said supply periods on the rise of the temperature toward the predetermined point.

The invention is illustrated in two preferred embodiments in the accompanying drawings wherein:

Fig. 1 is a diagrammatic view illustrating a portion of a railway car together with its heating system and one arrangement of thermostats and electric circuits connected in accordance with this invention for controlling the operation of the heating system.

Fig. 2 is a view similar to that of Fig. 1 illustrating a slightly different arrangement of thermostats whereby the outside thermostat is interposed in a circuit intermediate the inside thermostat and the electrically energized device.

Referring first to Fig. 1 of the drawing: 10 designates one end portion of a railway passenger car, provided with the usual vestibule space 11 and provided along the roof of the car with a duct 12 for supplying air to the interior of the car. The duct preferably communicates with the vestibule space through louvers 13, the fresh air being drawn into the space by means of a blower 14. A heater 15 is arranged in the duct 12 so as to heat the air in the duct 12 when it is desired to deliver heated air to the interior of the car. 16 designates the inlet pipe for delivering steam or other heating medium to the heater and 17 designates the return pipe therefrom. A supply of heating medium is controlled by means of a valve 18 which in the present embodiment is normally maintained in its open position by means of a spring 19, surrounding the valve stem at a location intermediate the valve casing and an abutment 20 positioned on the valve stem. The valve 18 is moved to its closed position by means of a solenoid consisting of a movable core 21 and an electric coil 22, the said coil 22 being termed herein as a working resistance and has such value that it does not become effective, in the circuits illustrated, until both thermostats 23 and 24 are closed. In other words the resistance of the main circuit is very low and the values of resistors 33, 38, 39 and 40, hereinafter described, are such that they will not draw sufficient current to operate coil 22. Obviously the solenoid coil 22 might be substituted for a suitable heater or any other form of working resistance. A plurality of thermostats, to wit, thermostats 23 and 24, are connected in series in the circuit for energizing the coil 22. The energizing circuit for the coil 22 includes the negative line 25, the coil 22, wire 26, contact 27 of thermostat 23, the mercury column of thermostat 23 to contact 28, wire 29, to contact 30 of thermostat 24, thence through the mercury column of the thermostat to contact 31 and the positive line 32. The mercury column of thermostat 23 is located below the contact 28, and therefore, opens the circuit through the coil 22 so that the valve 18 will open (by the action of spring 20) to allow steam to flow to the heater 15. When the temperature of the enclosed space rises to a predetermined point, for example 76°, the mercury column of thermostat 23 will rise to engage contact 28 and therefore close an energizing circuit through coil 22 so as to shut off the steam supply. As soon as the temperature of the enclosed space falls below a predetermined point, for example 76°, the circuit will be again broken at contact 28 so as to deenergize the coil 22 and thereby reopen the supply valve 18. When the mercury column of the outside thermostat recedes to a position below contact 31, which corresponds, for example, to 30° outside temperature, the energizing circuit for the coil 22 is broken at the contact and the electric current is directed through an auxiliary heater 39. This heater circuit is, of course, effective only when the mercury column of thermostat 23 is in contact with its upper contact 28 since both thermostats are connected in series.

The thermostat 23 is preferably of the two-bulb type and is provided with an auxiliary heater 33 which is energized by means of a circuit as follows: negative line 25, wire 34, variable resistor 35, wire 36, auxiliary heater coil 33, and thence through wire 37 to the positive line 32. The thermostat 23 is made so that a temperature of 76°, corresponding to the temperature of the space being controlled, plus a predetermined amount of added heat will cause its mercury column to engage the upper contact. This added heat is supplied from current passing through a variable resistor 35. Assuming the mercury column of thermostat 24 is in engagement with its upper contact 31 and the temperature of the enclosed space reaches 76°, this temperature of the space plus the heat added to the thermostat 23, through resistor 35, will cause the mercury column thereof to rise into engagement with contact 28, thereby closing the main operating circuit through the working resistance 22. When the temperature of the space falls below 76°, the mercury column of thermostat 23 recedes below contact 28, and, therefore, opens the main circuit. Simultaneously with the opening of said circuit, the electric potential in the heater circuit 32, 37, 33, 36, 35, 34 and 25 is raised sufficiently to cause current to flow through cycle resistor 38 so as to apply 4° added temperature to the thermostat. As soon as the mercury column again engages the upper contact 28, (assuming that the thermostat 24 is closed) the cycle resistor 38 is again cut out of the heater circuit so as to permit cooling of the heater. This cycling of the thermostat will continue until the temperature of the enclosed space reaches 76°. By varying the sliding contact of resistor 35, the amount of constant heat added to the coil 33 may be varied and thereby raise or lower the actual control temperature for the enclosed space being heated. For example, if the resistor 35 is adjusted so as to apply two additional degrees of heat, the control temperature for the enclosed space will be 74°. Likewise, if the resistor 35 is adjusted to reduce the amount of added heat to coil 33 to the extent of two degrees, this adjustment will result in changing the control temperature for the enclosed space to 78°.

The outside thermostat is of the two-bulb type and is provided with an auxiliary heater 39 which is supplied with current through cycle resistor 40 when the mercury column falls below the contact 31. The heater circuit includes the wire 29, cycle resistor 40, auxiliary heater coil 39, and wire 41 to the positive line 32. Preferably the cycle resistor 40 and the auxiliary heater 39 are so proportioned that 70° of heat is added to the thermostat when the mercury column of the thermostat recedes below the contact 31 while the mercury column of thermostat 23 is at or above the contact 28. The said thermostat 24 is made so that it will function without added heat at a temperature of 30°. Consequently, it will not cycle, that is, the mercury column will not fall below the upper contact 31 until the outside temperature falls below 30°. As soon as this condition takes place the resistor 40 is made effective to add the 70° of heat to the auxiliary heater 39 and, therefore, quickly returns the mercury column into engagement with the upper contact 31. In view of the fact that the thermostats themselves function to make and break the energizing circuit for the working resistance 22, condenser circuits are connected in the main circuit and extend around the contacts of both thermostats so as to prevent destructive sparking at the thermostat contacts. The condenser circuit for thermostat 23 includes wire 42, resistor 43, condenser 44 and wire 45. The condenser circuit for the outside thermostat comprises a wire 46 leading from the wire 29, a resistor 47, a condenser 48, and a wire 49 connecting in the positive line at the opposite side of the thermostat.

In operation, assuming that the mercury column of the inside thermostat has receded below the contact 28 so as to break the energizing circuit through the coil 22: This breaking of the circuit de-energizes the coil 22 and permits the entrance of steam to the heater 15. At the same time the cycle resistor 38 is made effective to add 4° of heat to the auxiliary heater 33, so as to cause its mercury column to again rise into engagement with the contact 28. As soon as this engagement occurs the cycle resistor 38 is, therefore, made ineffective and permits the auxiliary heater 33 to cool sufficiently to permit the mercury column to again recede from the upper contact 28 of the thermostat.

The mercury column of the outside thermostat is normally in a position above the contact 31, since the thermostat is designed to function only when the mercury recedes below the said contact, to wit, at 30° temperature. It will be observed therefore that when the outside temperature falls below 30° the current is broken at contact 31 of thermostat 24. Consequently, each time that the mercury column of the inside thermostat 23 engages the upper contact 28, current is passed through the cycle resistor 40 so as to add 70° of heat to the auxiliary heater 39 to cause the mercury column of thermostat 24 to again move upwardly toward its upper contact 31. It will be observed also that, during the heating period of the outside thermostat, the current flow will be obstructed to some extent by resistor 40 and consequently some of the current will pass through resistor 38 so as to supply added heat to thermostat 23. This results in holding the mercury column of the inside thermostat in engagement with the upper contact 28 for longer periods of time, than is the case when the outside thermostat is closed and, therefore, results in reducing the control temperature of the enclosed space being heated. However, when the outside temperature falls below 30°, the outside thermostat, in effect, takes control of the system and serves to vary the supply of heating medium to the radiators in direct relation to any further decline of the outside temperature, since the continued decline of the outside temperature results in reducing the frequency of the cycling action and, therefore, increases the time periods during which the supply valve 18 is permitted to stand open. For example, when the outside temperature falls below minus 40°, the resistor 40 will be available for supplying added heat to the auxiliary heater 39 100% of the time. At minus 5° the cycle resistor will be effective 50% of the time. The frequency of the cycling action of the resistor 40 will progressively increase during any further rise of outside temperature until it is made wholly ineffective at or above a temperature of 30°.

The embodiment illustrated in Fig. 2 is the same as that shown in Fig. 1 except that the position of contacts 30 and 31 are reversed in the outside thermostat designated 24ᵃ and the thermostat is interposed in the wire 26ᵃ of the circuit for energizing the working resistance 22ᵃ at a location intermediate the inside thermostat designated 23ᵃ. In all other respects the modification shown in Fig. 2 is identical with the circuits shown in Fig. 1 and are given the same reference characters. However, there is a different result obtained by arranging the outside thermostat in the manner indicated. By interposing the outside thermostat 24ᵃ in the circuit intermediate the inside thermostat and the working resistance 22ᵃ, the opening of the contacts 27—28 of thermostat 23ᵃ when contacts 30—31 of thermostat 24ᵃ are closed, directs heating current to the heater 39, but this merely adds heat to the already closed thermostat 24ᵃ. Also, the opening of the circuit at contact 30 of the said outside thermostat 24ᵃ directs current to heater 39 regardless of the condition of heater 23ᵃ, but does not result in passing heating current through resistor 38, as is the case in Fig. 1. Consequently the opening of the circuit at said contact 30 in Fig. 2 has no effect on the inside thermostat and therefore does not result in lowering the controlled temperature of the space when the outside temperature falls below 30°. Except for the differences above noted the operation of the modification shown in Fig. 2 is the same as described in connection with the embodiment shown in Fig. 1.

I claim:

1. In combination with means for supplying heat to an enclosed space including an electrically energized device, means for controlling the energization of said device comprising a main electric circuit and a plurality of thermostats connected in series in said circuit and responsive to temperature changes at different locations, whereby all of the thermostats cooperate to close said main circuit and any one of the thermostats may operate directly to break said main circuit, an auxiliary electric heater for one of said thermostats, an energizing circuit therefore which is parallel to the main electric circuit, an impedance connection leading from the auxiliary heater to said electric circuit at a location intermediate the last mentioned thermostat and said electrically energized device, a second impedance connection in the main circuit for by-passing electric current around the other thermostat, whereby additional heating current flows through said auxiliary heater when said main electric circuit is opened at the said last mentioned thermostat.

2. In combination with means for supplying heat to an enclosed space including an electrically energized device, means for controlling the energization of said device comprising a main electric circuit and a plurality of thermostats of the mercury column type connected in series in said circuit and responsive to temperature changes at different locations whereby all of the thermostats cooperate to close said main circuit and any one of the thermostats may operate directly to break the main circuit, an auxiliary electric heater for one of said thermostats, an energizing circuit therefor which is parallel to the main electric circuit, an impedance connection leading from the said auxiliary heater to the said main electric circuit at a location intermediate the last mentioned thermostat and said electrically energized device, whereby additional heating current flows through said auxiliary heater when the said main electric circuit is opened at the said last mentioned thermostat; an auxiliary electric heater for a second of said thermostats, and an energizing circuit therefor connected in the main electric circuit and at opposite sides of the second thermostat, so as to direct heating current to the last mentioned auxiliary heater when the main circuit is opened at said second thermostat.

3. In combination with means for supplying heat to an enclosed space including an electrically energized device, means for controlling the energization of said device comprising a main electric circuit including a thermostat interposed therein and responsive to a predetermined temperature within the enclosed space for changing the condition of said circuit, a second thermostat interposed in said main circuit and responsive to a predetermined outside temperature to change the condition of said circuit, an auxiliary heater for the first mentioned thermostat, an energizing circuit therefore which has a resistance value substantially higher than the main circuit and is parallel thereto, and an impedance connection leading from the auxiliary heater to the main circuit at a location intermediate the first mentioned thermostat for said electrically energized device to permit a predetermined flow of current through said auxiliary heater when the main electric circuit is opened only at the first mentioned thermostat, and a variable resistor interposed in said parallel circuit for varying the intensity of electric currents supplied to said auxiliary heater.

4. In combination with means for supplying heat to an enclosed space including an electrically energized device, means for controlling the energization of said device comprising a main electric circuit including a thermostat interposed therein and responsive to a predetermined temperature within the enclosed space for changing the condition of said circuit, a second thermostat interposed in said main circuit and responsive to a predetermined outside temperature to change the condition of said circuit, an auxiliary heater for the first mentioned thermostat, an energizing circuit therefor which is parallel to the main circuit, a variable resistor in said parallel circuit for varying the intensity of electric currents supplied to said auxiliary heater, and a cycle resistor leading from the heater circuit at a location intermediate the heater and said variable resistance and connected in said main circuit at a location intermediate the first mentioned thermostat and said electrically energized device for increasing the flow of electric current through the auxiliary heater when the said main circuit is opened only at the first mentioned thermostat.

5. In combination with means for supplying heat to an enclosed space including an electrically energized device, means for controlling the energization of said device comprising a main electric circuit including a thermostat interposed therein and responsive to a predetermined temperature within the enclosed space for changing the condition of said circuit, a second thermostat interposed in said main circuit and responsive to a predetermined outside temperature to change the condition of said circuit, an auxiliary heater for the first mentioned thermostat, an energizing circuit therefor which is parallel to the main circuit, a variable resistor in said parallel circuit for varying the intensity of electric currents supplied to said auxiliary heater, and a cycle resistor leading from the heater circuit at a location intermediate the heater and said variable resistance and connected in said main circuit at a location intermediate the first mentioned thermostat and said electrically energized device for increasing the flow of electric current through the auxiliary heater when the said main circuit is opened only at the first mentioned thermostat; the thermostats being arranged in series so that the outside thermostat will function to open the main circuit only when the circuit is effective through the inside thermostat.

TIMOTHY J. LEHANE.

REFERENCES CITED

The following references are of record in the file of this patent:

UNITED STATES PATENTS

| Number | Name | Date |
|---|---|---|
| 1,649,090 | Willhoeft | Nov. 15, 1927 |
| 1,798,923 | Baker | Mar. 31, 1931 |
| 1,803,629 | Lidberg | May 5, 1931 |
| 1,921,172 | Taylor et al. | Aug. 8, 1933 |
| 1,961,252 | Shivers | June 5, 1934 |
| 2,063,613 | McCarthy | Dec. 8, 1936 |
| 2,075,160 | Baker | Mar. 30, 1937 |
| 2,168,680 | Nordgren | Aug. 8, 1939 |
| 2,171,803 | Parks et al. | Sept. 5, 1939 |
| 2,181,436 | Madden | Nov. 28, 1939 |
| 2,204,403 | Crago | June 11, 1940 |
| 2,307,724 | Anderson | Jan. 5, 1943 |
| 2,328,472 | Lehane et al. | Aug. 31, 1943 |
| 2,363,413 | Guenzel et al. | Nov. 21, 1944 |
| 2,394,708 | Masek | Feb. 12, 1946 |

FOREIGN PATENTS

| Number | Country | Date |
|---|---|---|
| 499,235 | Great Britain | Jan. 20, 1939 |